(12) United States Patent
Lee et al.

(10) Patent No.: US 8,670,430 B2
(45) Date of Patent: Mar. 11, 2014

(54) APPARATUS FOR TRANSMITTING UPLINK SIGNAL IN MIMO WIRELESS COMMUNICATION SYSTEM AND METHOD THEREOF

(75) Inventors: Dae Won Lee, Anyang-si (KR); Ki Jun Kim, Anyang-si (KR); Joon Kui Ahn, Anyang-si (KR); Byeong Woo Kang, Anyang-si (KR); Yu Jin Noh, Anyang-si (KR); Byoung Hoon Kim, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 401 days.

(21) Appl. No.: 13/145,173

(22) PCT Filed: Mar. 3, 2010

(86) PCT No.: PCT/KR2010/001332
§ 371 (c)(1),
(2), (4) Date: Jul. 19, 2011

(87) PCT Pub. No.: WO2010/101414
PCT Pub. Date: Sep. 10, 2010

(65) Prior Publication Data
US 2011/0274075 A1 Nov. 10, 2011

Related U.S. Application Data

(60) Provisional application No. 61/157,167, filed on Mar. 3, 2009.

(30) Foreign Application Priority Data

Dec. 29, 2009 (KR) ........................ 10-2009-0132334

(51) Int. Cl.
*H04J 1/00* (2006.01)
*H04L 5/00* (2006.01)

(52) U.S. Cl.
CPC .................................. *H04L 5/0007* (2013.01)
USPC ........... 370/343; 370/321; 370/328; 370/329; 370/334; 370/338; 370/342; 370/436; 370/441; 370/478; 375/260

(58) Field of Classification Search
None
See application file for complete search history.

(56) References Cited

U.S. PATENT DOCUMENTS

| 2007/0005749 A1 | 1/2007 | Sampath |
| 2007/0291640 A1 | 12/2007 | Zhang et al. |

(Continued)

FOREIGN PATENT DOCUMENTS

| CN | 101233713 A | 7/2008 |
| JP | 2006-262537 A | 9/2006 |

(Continued)

OTHER PUBLICATIONS

3GPP, "Technical Specification Group Radio Access Network; Physical Channels and Modulation (Release 8)," 3GPP TS 36.211 V1.1.0, May 2007, pp. 11-13, and 25-29.

(Continued)

*Primary Examiner* — Faruk Hamza
*Assistant Examiner* — Aixa A Guadalupe Cruz
(74) *Attorney, Agent, or Firm* — Birch, Stewart, Kolasch & Birch, LLP

(57) ABSTRACT

A method of multiplexing control information and data information in a wireless communication system is disclosed. The present invention includes mapping codewords corresponding to the data information to a preset number of layers, mapping the control information to the preset number of the layers, multiplexing the layer-mapped data information and the layer-mapped control information into a frequency region within an SC-FDMA symbol, and transmitting the SC-FDMA symbol to a base station via multiple antennas.

13 Claims, 16 Drawing Sheets

(56) References Cited

U.S. PATENT DOCUMENTS

2008/0153425 A1 6/2008 Heo et al.
2008/0192718 A1 8/2008 Jongren et al.
2008/0225964 A1 9/2008 Han et al.

FOREIGN PATENT DOCUMENTS

| JP | 2007-184933 A | 7/2007 |
| KR | 10-2008-0095712 A | 10/2008 |
| WO | WO 2007/011138 A2 | 1/2007 |
| WO | WO 2008/048055 A1 | 4/2008 |
| WO | WO 2008/075890 A1 | 6/2008 |

OTHER PUBLICATIONS

Motorola, "OFDMA vs. SC-FDMA—Study on Hybrid Scenario for LTE-A UL Access," TSG-RAN WG1 #55bis, R1-090322, Ljubljana, Slovenia, Jan. 12-16, 2009, pp. 1-5.

Rapporteur (Samsung), "Miscellaneous corrections and clarifications resulting from ASN.1 review (64 LTE 17)," 3GPP TSG-RAN2 Meeting #65, R2-091971, Athens, Greece, Feb. 9-13, 2009, 22 pages.

QUALCOMM Europe et al., "Calculation of ΔTF(i) for UL-PC", 3GPP TSG-RAN Meeting #53, R1-082258, May 5-9, 2008, 3 pages provided.

(a)

(b)

APPARATUS FOR TRANSMITTING UPLINK SIGNAL IN MIMO WIRELESS COMMUNICATION SYSTEM AND METHOD THEREOF

This application is the National Phase of PCT/KR2010/001332 filed on Mar. 3, 2010, which claims priority under 35 U.S.C. 119(e) to U.S. Provisional Application No. 61/157,167 filed on Mar. 3, 2009 and under 35 U.S.C. 119(a) to Patent Application No. 10-2009-0132334 filed in the Republic of Korea on Dec. 29, 2009, all of which are hereby expressly incorporated by reference into the present application.

TECHNICAL FIELD

The present invention relates to a wireless mobile communication system, and more particularly, to a method of transmitting an uplink signal from user equipment in an MIMO wireless communication system.

BACKGROUND ART

Generally, MIMO is the method of using a plurality of transmitting antennas and a plurality of receiving antennas, by which data transmission/reception efficiency can be enhanced. In particular, a transmitting or receiving side of a wireless communication system uses a plurality of antennas to increase capacity or enhance performance. In this disclosure, the MIMO can be called 'multiple-antenna'.

In order to receive one whole message, the MIMO technique does not depend on a signal antenna path. Instead, the MIMO technique completes data by gathering data fragments received via plural antennas. If the MIMO technique is used, a data transmit speed (data rate) is raised or system coverage can be increased by securing a specific data rate. Moreover, this technique is widely applicable to a mobile communication terminal, a relay and the like. According to the MIMO technique, it is able to overcome the throughput limit of the conventional mobile communication that adopts a single antenna.

FIG. 1 is a block diagram of a general MIMO communication system. Referring to FIG. 1, NT transmitting antennas are provided to a transmitting side, while NR receiving antennas are provided to a receiving side. If each of the transmitting and receiving sides uses a plurality of antennas, the theoretical channel transmission capacity is increased bigger than that of the case that either the transmitting side or the receiving side uses a plurality of antennas. In this case, the channel transmission capacity is increased in proportion to the number of antennas. Therefore, a data rate is raised and frequency efficiency is enhanced. The data rate according to the increase of the channel transmission capacity can be theoretically raised by an amount resulting from multiplying a maximum data rate $R_0$ of the case of using a single antenna by an increase rate $R_i$. In this case, $R_i$ is a smaller value between $N_T$ and $N_R$.

For instance, in MIMO communication system using 4 transmitting antennas and 4 receiving antennas, it is able to obtain a data rate 4 times greater than that of a single antenna system theoretically. After the theoretical capacity increase of the multiple antenna system has been proved in the mid-90s, many efforts are ongoing to research and develop various techniques to realize the substantial enhancement of data rate. And, standards of the 3rd generation mobile communication and various wireless communications have already reflected some of these techniques.

The MIMO techniques can be classified into a spatial diversity scheme of raising transmission reliability using the same symbols through various channel paths and a spatial multiplexing scheme of enhancing a transmission rate by simultaneously transmitting a plurality of different data symbols using a plurality of transmitting antennas. Moreover, by combining the two schemes appropriately, it is able to obtain advantages of the two schemes properly.

DISCLOSURE OF INVENTION

Technical Problem

Regarding the MIMO techniques, many efforts are ongoing to research and develop the information theory study relevant to MIMO communication capacity calculation in various channel configurations and multiple access environments, radio channel measurement and modeling study in MIMO communication system, spatiotemporal signal processing technology study for transmission reliability and data rate enhancements and the like in various aspects. However, in order to raise the transmission reliability, the demand for a method of implementing transmit diversity and multiplexing efficiently in SC-FDMA (single carrier-frequency division multiple access) system is rising.

Solution to Problem

Accordingly, the present invention is directed to a wireless communication system that substantially obviates one or more of the problems due to limitations and disadvantages of the related art.

An object of the present invention is to provide a method of transmitting an uplink signal from a user equipment in an MIMO wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of multiplexing control information and data information in a wireless communication system includes the steps of mapping codewords corresponding to the data information to a preset number of layers, mapping the control information to the preset number of the layers, multiplexing the layer-mapped data information and the layer-mapped control information into a frequency region within an SC-FDMA symbol, and transmitting the SC-FDMA symbol to a base station via multiple antennas.

Preferably, the step of mapping the control information to the layers further includes the step of dividing the control information by the number of the codewords corresponding to the data information.

Preferably, the step of mapping the control information to the layers further includes the steps of mapping the control information to one of the preset number of the layers and mapping at least one of a pilot sequence, a zero sequence and a data sequence to the rest of the layers.

Preferably, the multiplexing step includes the step of sequentially combining the layer-mapped data information and the layer-mapped control information together.

Preferably, the multiplexing step includes the step of superposing the layer-mapped data information and the layer-mapped control information on each other.

To further achieve these and other advantages and in accordance with the purpose of the present invention, a user equipment apparatus includes a first layer mapping module configured to map codewords corresponding to data information to a preset number of layers, a second layer mapping module configured to map control information to the preset number of the layers, and a multiplexing module configured to multiplex the layer-mapped data information and the layer-mapped control information into a frequency region within an SC-FDMA symbol.

Preferably, the second layer mapping module divides the control information by the number of the codewords corresponding to the data information.

Preferably, the second layer mapping module maps the control information to one of the preset number of the layers and also maps at least one of a pilot sequence, a zero sequence and a data sequence to the rest of the layers.

Preferably, the multiplexing module serially combines the layer-mapped data information and the layer-mapped control information together.

Preferably, the multiplexing module superposes the layer-mapped data information and the layer-mapped control information on each other.

It is to be understood that both the foregoing general description and the following detailed description are exemplary and explanatory and are intended to provide further explanation of the invention as claimed.

Advantageous Effects of Invention

According to embodiments of the present invention, a user equipment in an MIMO wireless communication system is able to effectively transmit an uplink signal to a base station.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, eNode B, a base station and the like.

Figure 1:
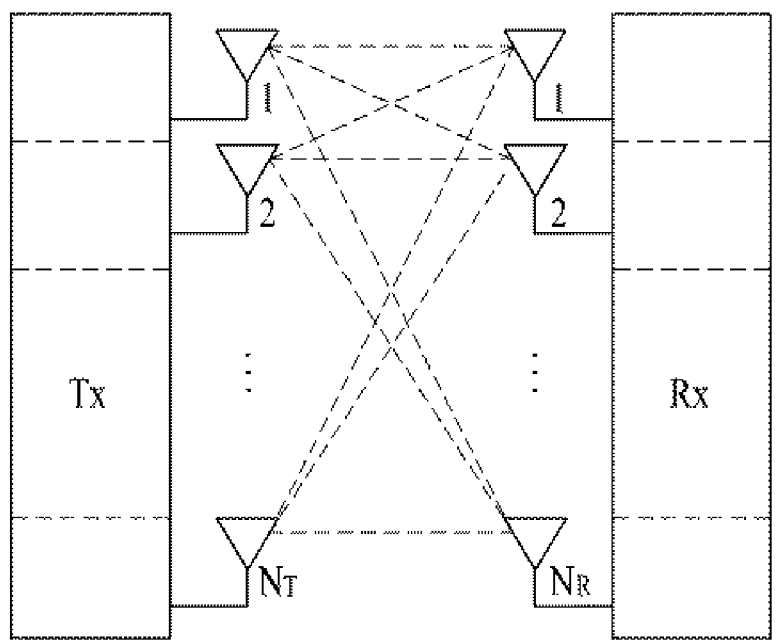
FIG. 1 is a diagram for configuration of a general MIMO communication system.
Figure 2:
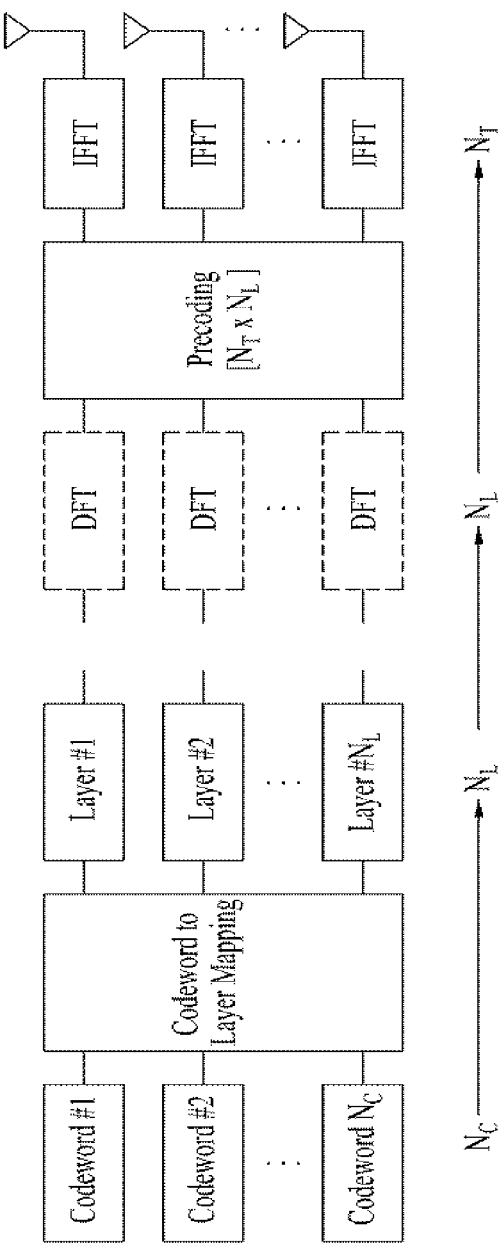
FIG. 2 is a diagram for explaining relations among codewords, layers and antennas for transmitting uplink signals of data in MIMO wireless communication system.

FIG. 2 is a diagram for explaining relations among codewords, layers and antennas for transmitting uplink signals of data in MIMO wireless communication system.

Referring to FIG. 2, complicated mapping relations exist between data information and transmission symbol. First of all, a MAC (medium access control) layer delivers NC transmission blocks as data information to a physical layer. In the physical layer, the transmission blocks are converted to codewords through channel coding and such a rate matching as puncturing, repetition and the like is performed. In this case, the channel coding is performed by a channel coder such as a turbo encoder, a tail bit convolution encoder and the like.

After completion of the channel coding and the rate matching, the $N_C$ codewords are mapped to $N_L$ layers. In this case, each of the layers means different information sent by MIMO technique. And, the number of the layers should not be greater than a rank that is a maximum number for sending different informations. This can be expressed as # of Layers_rank($H$)_min($N_T,N_R$), where H indicates a channel matrix.

Unlike such a general DL transmission scheme as an OFDMA (Orthogonal Frequency Division Multiple Access) transmission, in an uplink signal transmitted by SC-FDMA (single carrier-frequency division multiple access), a DFT process is performed on each layer to enable a transmission signal to have a single carrier property by canceling out IFFT (inverse fast Fourier transform) processing influence in part. The DFT transformed signals in the layers are multiplied by a precoding matrix, are mapped to $N_T$ transmitting antennas, and are then transmitted to a base station through IFFT process.

Meanwhile, a peak to average power ratio (PAPR) is associated with a dynamic range a power amplifier should support in a transmitting side. And, a cubic metric (CM) value is another numerical value that represents a numerical value indicated by the PAPR. Generally, a CM or PAPR of such a signal having a single carrier property as an SC-FDMA transmission signal is considerably lower than that of a multi-carrier signal. For instance, assuming that one information symbols is transmitted via one subcarrier, if a transmission signal y is constructed with information symbol $x_1$ only, this transmission signal is a single carrier signal (y=$x_1$). Yet, if the transmission signal is constructed with a plurality of information symbols $x_1, x_2, x_3, \ldots, x_N$, it is a multi-carrier signal (y=$x_1+x_2+x_3+ \ldots +x_N$). As information symbols are superposed on one other, a signal carried on a multi-carrier generates a signal having a high amplitude. Hence, a CM or PAPR is high.

Meanwhile, although a CM or PAPR increases in proportion to the number of superposed symbols in a transmission signal waveform, if control information is simply added to data information carried through a single carrier property proposed in the following, the CM or PAPR does not increase considerably. Nonetheless, it is able to maintain a CM or PAPR considerably smaller than that of a signal carried on a multi-carrier.

In the following description, a configuration of SC-FDMA frame for transmitting data information is explained prior to the description of a method of multiplexing data information and control information according to the present invention.

Figure 3:
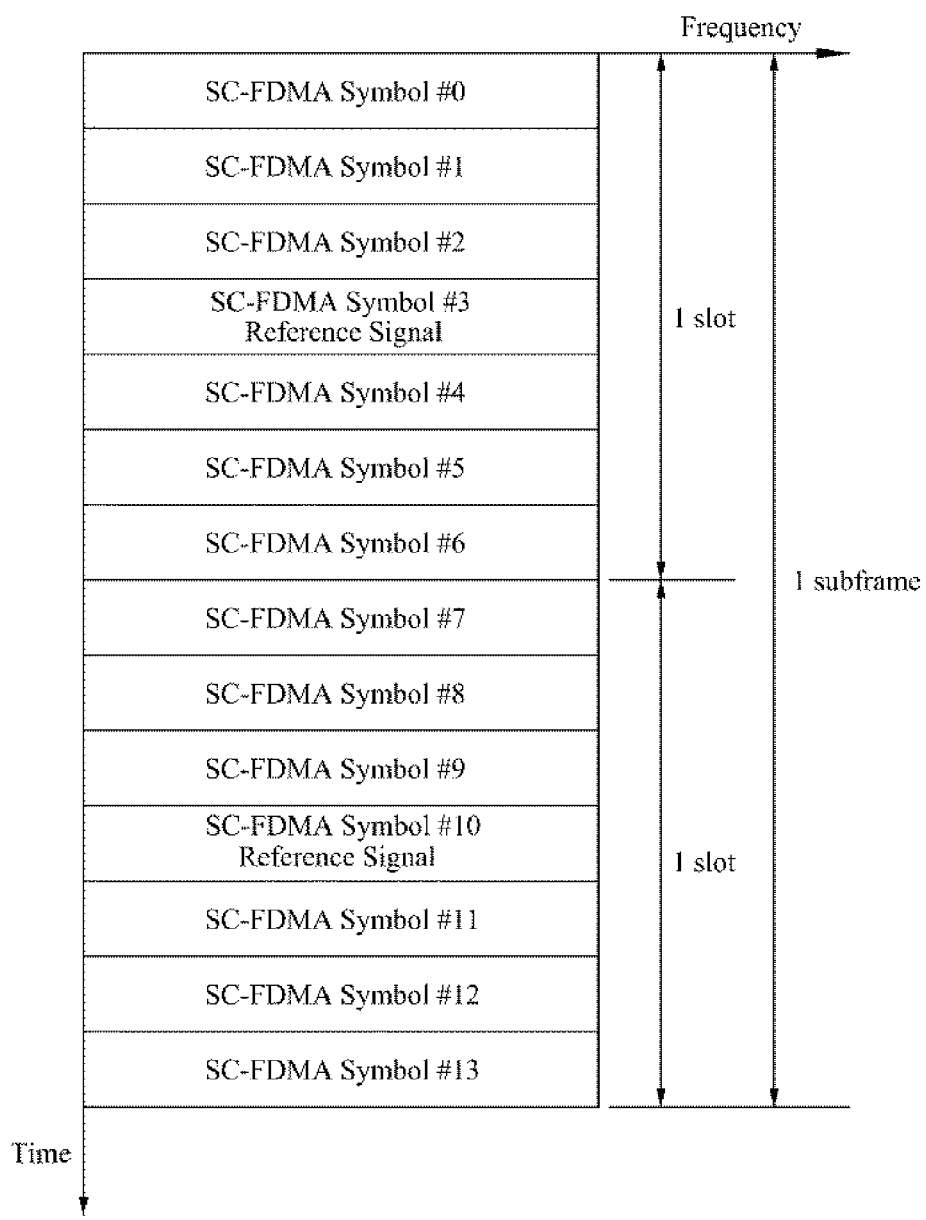
FIG. 3 is a diagram for a structure of a general SC-FDMA transmission frame.

FIG. 3 is a diagram for a structure of a general SC-FDMA transmission frame.

Referring to FIG. 3, a basic transmission unit on a time axis is 1 subframe and 2 slots construct 1 subframe. If an inserted CP (cyclic prefix) is a normal CP, the number of symbols constructing 1 slot is 7. In case of an extended CP, 6 symbols construct 1 slot. And, at least one reference signal symbol is included in each slot. Moreover, 1 SC-FDMA symbol includes a plurality of subcarriers.

Resource element can be defined as '1 subcarrier*1 symbol resource', i.e., a subcarrier carrying 1 complex symbol. If a DFT process is applied, the definition of the resource element can mean a subcarrier carrying 1 complex symbol defined as a DFT index through the DFP process. Yet, in SC-FDMA, since a DFT size is equal to the number of subcarriers used for data transmission, the meaning of the DFT size is conceptionally identical to that of the subcarrier number.

Meanwhile, a timing point of transmitting control information is significantly meaningful unlike data information. Therefore, the control information prefers reliable transmission to fast transmission. And, HARQ scheme is no applied to the control information. Thus, in case that control information and data information are transmitted together, the control information is requested to become robust against a transmission path. In the following description, a method of multiplexing control information and data information for enabling a base station to secure reliability of control information reception is proposed.

First Embodiment

Figure 4:
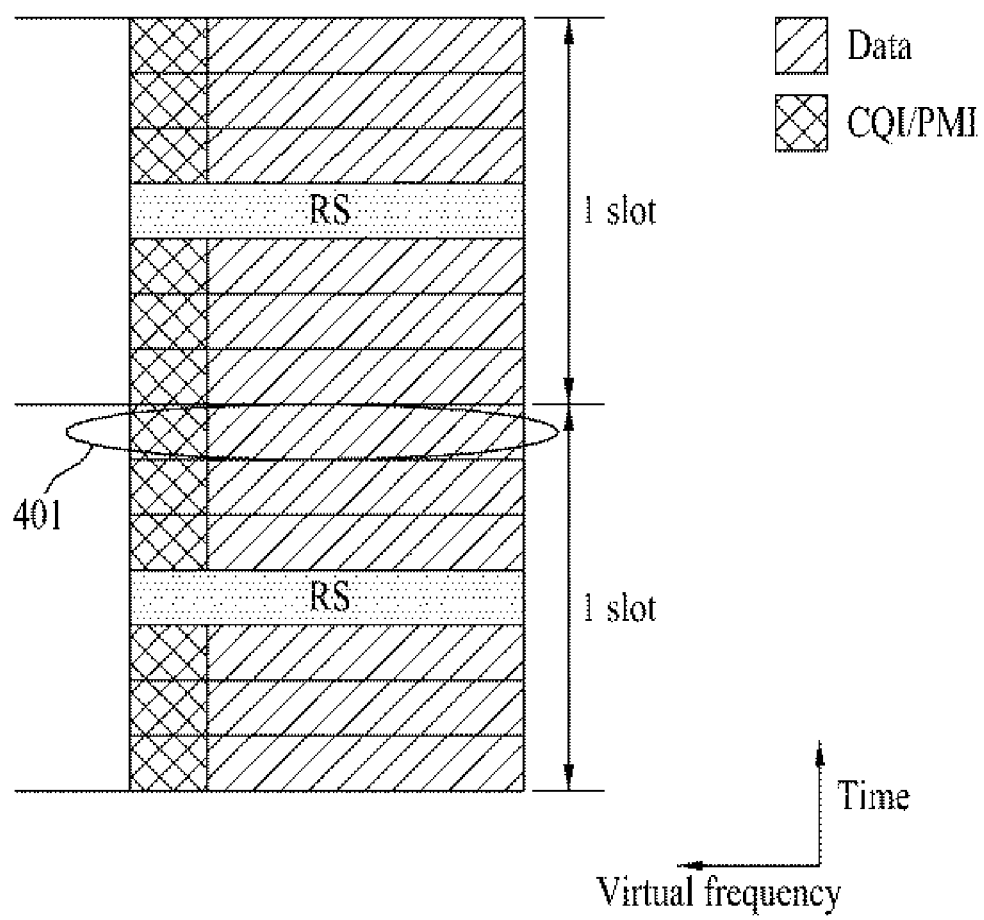
FIG. 4 is a diagram for a structure of an uplink frame in which control information and data information are multiplexed with each other according to a first embodiment of the present invention.

A first embodiment of the present invention relates to a method of multiplexing control information and data information prior to DFT execution. First of all, a layer mapping process is performed on each of the control information and the data information. A control information mapped layer and a data information mapped layer are combined by 1:1. A DFT process is then executed. FIG. 4 is a diagram for a structure of an uplink frame in which control information and data information are multiplexed with each other according to a first embodiment of the present invention. Specifically, FIG. 4 logically shows a multiplexed structure of control information and data information prior to DFT execution. And, control information and data information of an actually transmitted signal can be distributed to a frequency domain.

Referring to FIG. 4, UCI (uplink control information) such as CQI (channel quality information), PMI (precoding matrix index) and the like is multiplexed with data information in frequency domain and then shares the same time domain, i.e., a frequency axis in SC-FDMA symbol, with the data information. For clarity and convenience of description, in the following drawings including FIG. 4, CQI and PMI are shown only. Yet, other control information such as RI (rank indicator) information, ACK/NACK information and the like can be further included. Moreover, control information is mapped in a manner of being evenly distributed to SC-FDMA symbols differing from each other. Although FIG. 4 shows that control information and data information are continuously allocated on a frequency axis, the control information and the data information are shown with reference to a virtual frequency axis and can be physically allocated discontinuous subcarriers.

A process for multiplexing a signal carried on a specific SC-FDMA symbol 401 shown in FIG. 4 is described with reference to FIG. 5.

Figure 5:
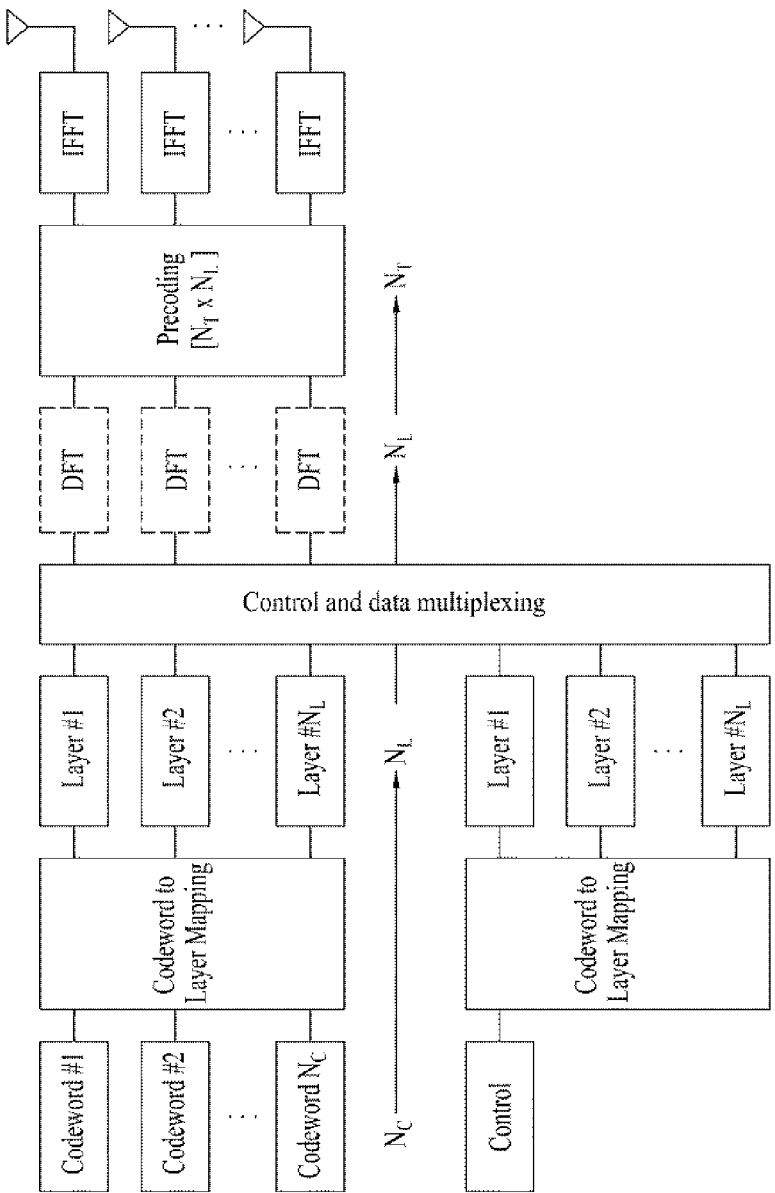
FIG. 5 is a diagram for explaining a method of transmitting an uplink signal according to a first embodiment of the present invention.

FIG. 5 is a diagram for explaining a method of transmitting an uplink signal according to a first embodiment of the present invention.

Referring to FIG. 5, multiplexing of control information and data information can be performed by a serial connection between control information and data information, which were mapped to layers prior to DFT execution, respectively. In this case, as the control information mapped layer and the data information mapped layer are combined by 1:1, the control information should be mapped to the layers of which number is equal to that of the data information mapped layers. Yet, since the data information is divided into a plurality of codewords, the control information is configured with one codeword only. Therefore, it is necessary to consider a method of mapping the control information configured with one codeword only to a plurality of layers like the data information.

In particular, in order to serially combine control information and data information with each other by 1:1, if the data information is mapped to $N_L$ layers, the control information should be mapped to $N_L$ layers as well. Therefore, it is able to consider a method of simply discriminating control information with the same number of codewords corresponding to data information according to a first embodiment of the present invention. By this method, data information and control information can perform a layer mapping process of the same structure. In particular, codewords corresponding to data information are mapped to $N_L$ layers and codewords corresponding to control information can be mapped to $N_L$ layers.

In the following description, a modified example of the layer mapping process of control information according to the first embodiment is explained. This modified example is a method of mapping control information configured with one codeword to NL layers instead of simply discriminating control information by the same number of codewords corresponding to data information.

Figure 6:
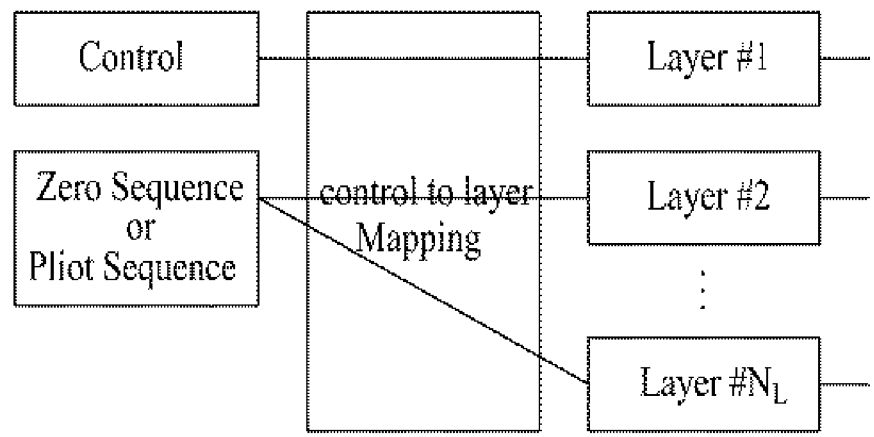
FIG. 6 is a diagram for a first modified example of a first embodiment of the present invention.
Figure 6:
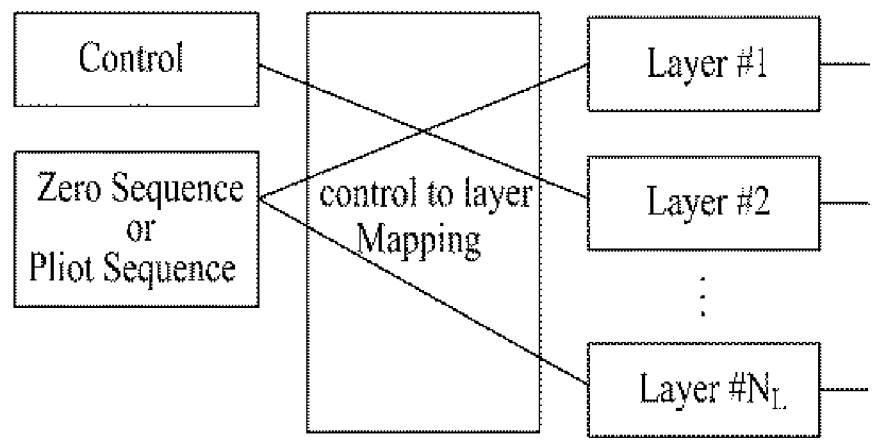

FIG. 6 is a diagram for a first modified example of a first embodiment of the present invention.

Referring to FIG. 6, in mapping control information constructed with one codeword to $N_L$ layers, the control information is mapped to one layer. Additionally, at least one of a preset pilot sequence, a zero sequence (0-sequence) and a data sequence is mapped to the rest of ($N_L$−1) layers. Especially, this pilot or zero sequence is usable as a useful means for canceling out inter-layer interference that may be generated from spatial multiplexing performed by a base station.

A modified example of a method for multiplexing the layer-mapped control information of the first embodiment with data information is explained as follows.

Figure 7:
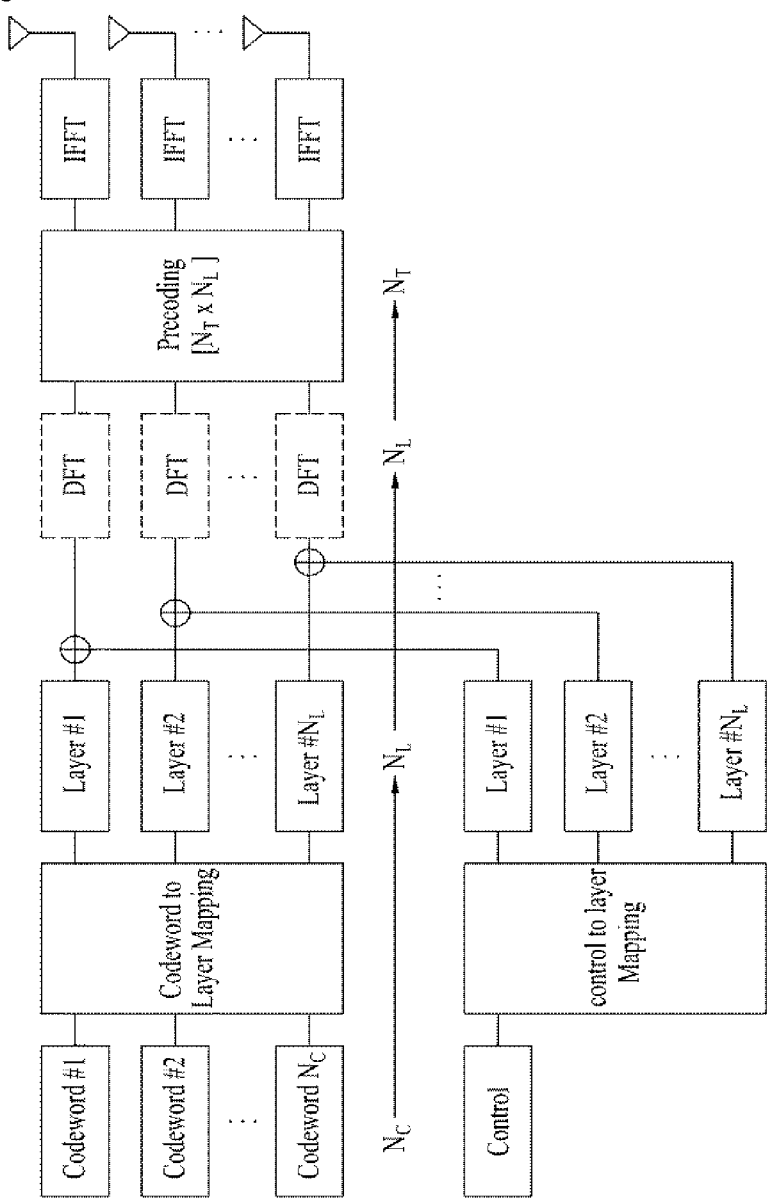
FIG. 7 is a diagram for a second modified example of a first embodiment of the present invention.

FIG. 7 is a diagram for a second modified example of a first embodiment of the present invention.

Referring to FIG. 7, instead of multiplexing control information and data information with each other by securing an additional resource for the control information, control information and data information are simply superposed on each other. In this case, it is able to consider a method of discriminating the control information and the data information from each other by applying a code to each of the control information and the data information or to the data information only. Yet, a base station needs to use a separate receiving device for discriminating the control information and the data information in a transmission signal having the control information the data information superposed on each other.

According to the second modified example of the first embodiment, since control information and data information are transmitted in a manner of being superposed on each other, it is advantageous in that a resource is not additionally used. Yet, it is disadvantageous in that a PAPR may be raised.

Second Embodiment

A second embodiment of the present invention relates to a method of performing DFT on control information and data information respectively and then multiplexing the control information and the data information on a frequency axis.

Figure 8:
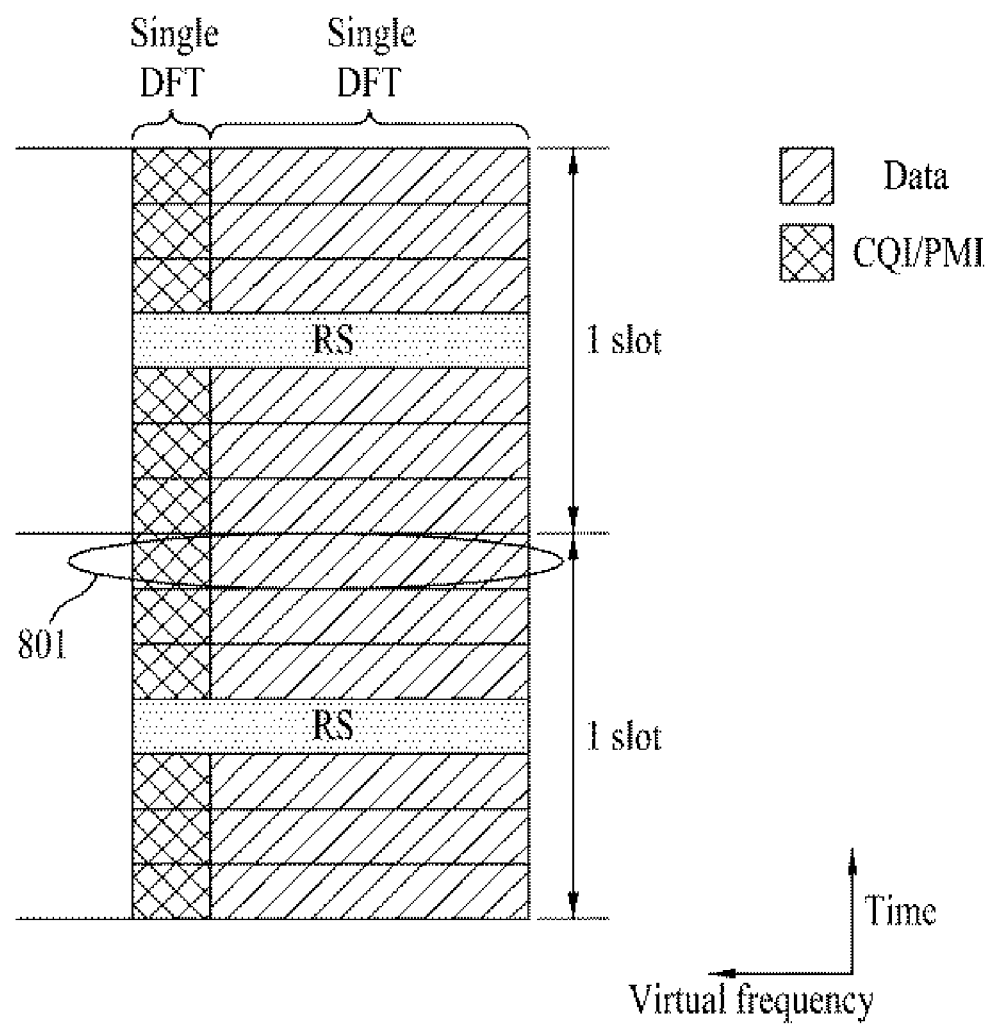
FIG. 8 is a diagram for a structure of an uplink frame in which control information and data information are multiplexed on a frequency axis according to a second embodiment of the present invention.

FIG. 8 is a diagram for a structure of an uplink frame in which control information and data information are multiplexed on a frequency axis according to a second embodiment of the present invention. A second embodiment of the present invention differs from the first embodiment of the present invention in that a DFT process is separately performed on data information and control information. In particular, one DFT process is performed on control information and another DFT process is performed on data information. And, the DFT-performed control information and the DFT-performed data information are mapped by different subcarriers, respectively. In this case, a size of the DFT for the control information can differ from that of the DFT for the data information. In order to explain a process for multiplexing a signal carried on a specific SC-FDMA symbol 801, FIG. 9 is described as follows.

Figure 9:
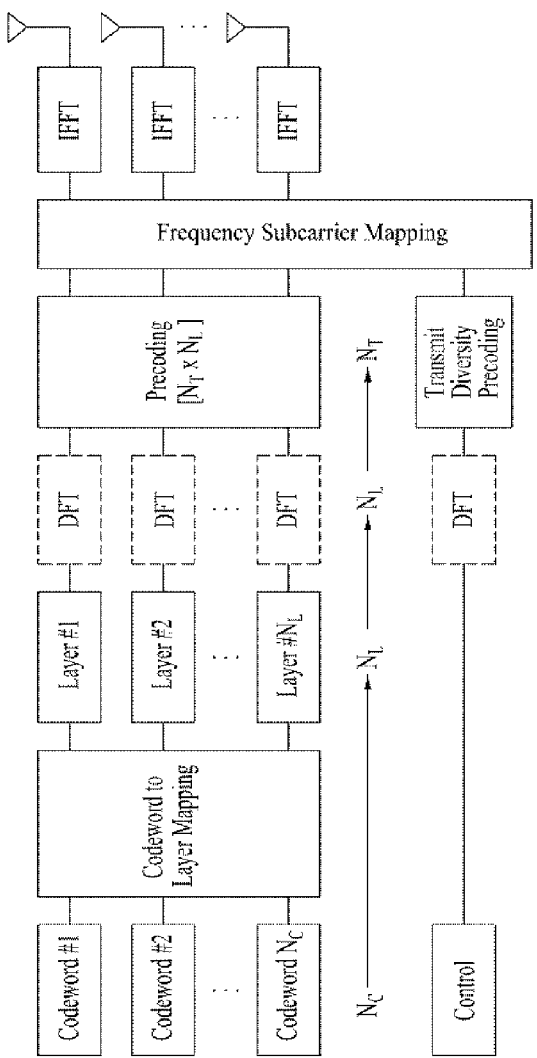
FIG. 9 is a diagram for explaining a method of transmitting an uplink signal according to a second embodiment of the present invention.

FIG. 9 is a diagram for explaining a method of transmitting an uplink signal according to a second embodiment of the present invention. FIG. 9 shows that DFT is performed on control information as well, which is just exemplary for clarity of description. And, it should be noted that the control information can skip the DFT process.

Referring to FIG. 9, since the number of layers for carrying control information is different from that of layers for carrying data information, different MIMO schemes are applicable. In particular, it is possible to perform transmission using one precoding matrix optimized for the control information and another precoding matrix optimized for the data information. Therefore, control information is transmittable using such a transmit diversity scheme as STBC (space time block coding), SFBC (space frequency block coding) and FSTD (frequency switching transmit diversity), whereas data is transmittable using a precoded spatial multiplexing scheme.

Thus, the control and data informations through the DFT process and the precoding process are multiplexed together in the course of being mapped to subcarriers. In doing so, it is able to implement discontinuous mapping using such a concept as a cluster. In this case, the cluster means a partial set of subcarriers for uplink transmission in whole subcarrier area. In the following description, explained is a process for mapping control information and data information to subcarriers.

FIGS. 10 to 13 are diagrams for an example of subcarrier mapping according to a second embodiment of the present invention.

Figure 10:
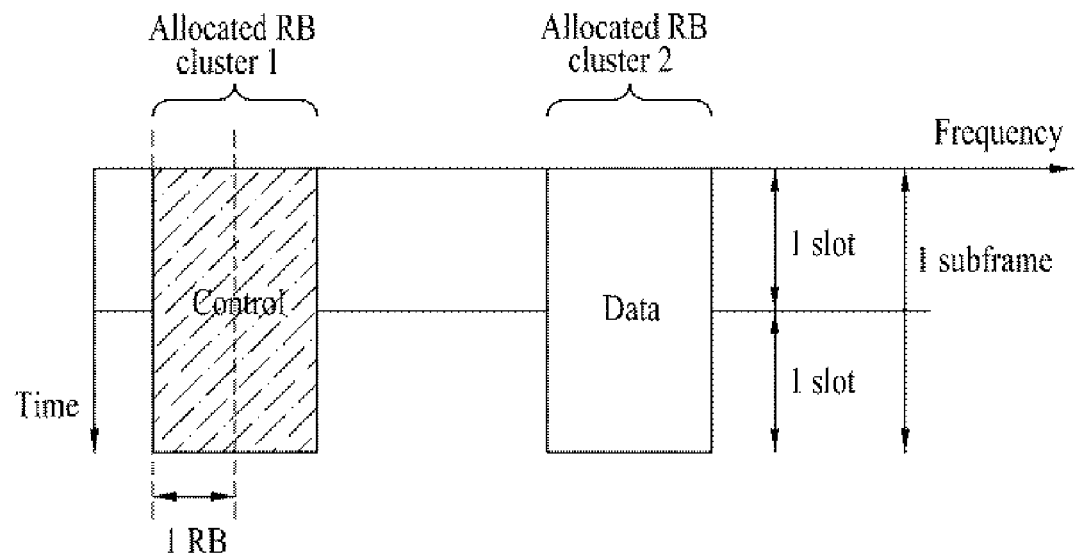
FIGS. 10 to 13 are diagrams for an example of subcarrier mapping according to a second embodiment of the present invention.

Referring to FIG. 10, according to a first method of subcarrier mapping, subcarriers are divided into a plurality of clusters and control information is then mapped to a first cluster. In this case, the first cluster means a cluster constructed with subcarriers having a low index, i.e., a low frequency.

Figure 11:
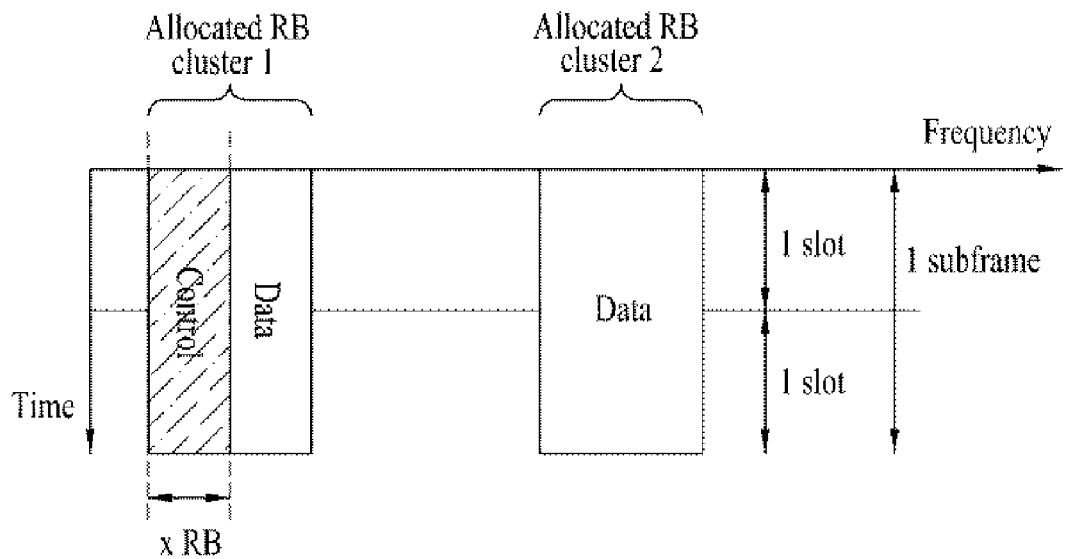

FIG. 11 shows a second method of subcarrier mapping.

Referring to FIG. 11, control information is allocated to random continuous resource blocks among allocated resource blocks. In this case, the allocated resource block means a continuous resource block that is logically allocated.

Although 10 resource blocks allocated for uplink transmission are divided into 3 discontinuous clusters, if control information is allocated to 2 upper resource blocks, the control information can be physically allocated to continuous or discontinuous resource blocks. FIG. 11 shows a structure that control information is allocated to x-upper source blocks among the whole of allocated resource blocks.

The number of resource blocks allocated to control information is changeable by MCS (modulation and coding scheme) level of the control information. Since a base station does not need to discriminate two clusters for discriminating the control information and data information from each other, it is able to secure scheduling flexibility of the base station.

Figure 12:
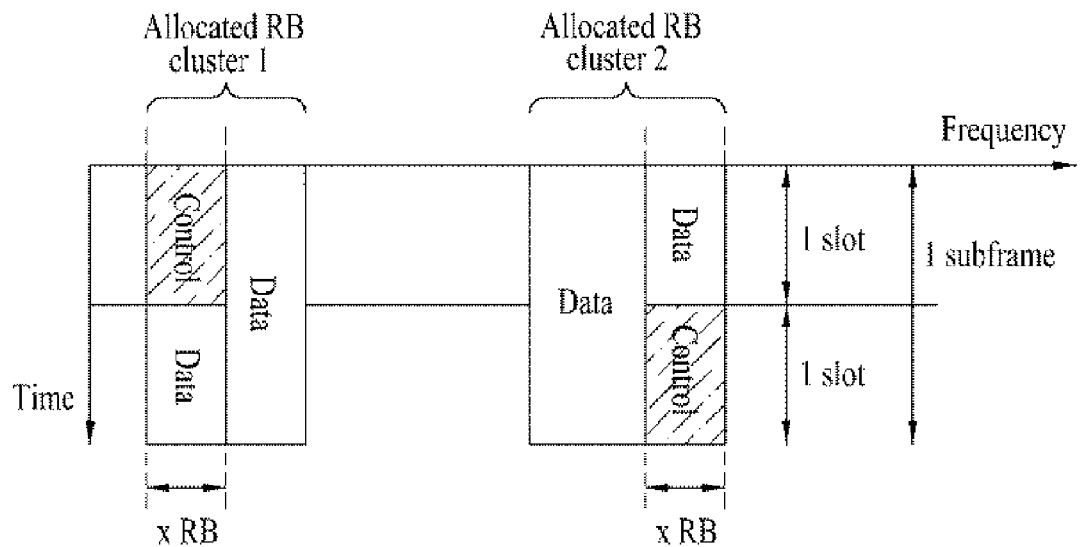

FIG. 12 shows a modified example of the above-mentioned mapping method shown in FIG. 11. FIG. 12 differs from FIG. 11 in that a resource allocated to control information is changed according to time (e.g., each slot). In particular, although control information is mapped to x upper resource blocks in a first slot, control information is mapped to x lower resource blocks in a second block. By this mapping method, the control information is able to obtain frequency diversity and robustness, and control information transmission signal can be secured. Moreover, the resource allocation change according to time can be implemented in a manner of changing a transmitting antenna.

Figure 13:
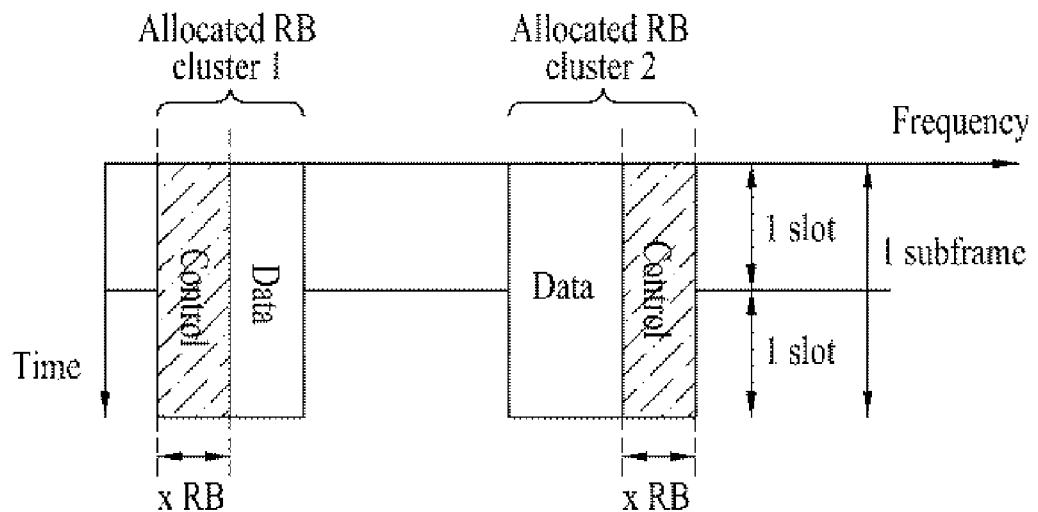

FIG. 13 shows another modified example of the above-mentioned second subcarrier mapping method.

Referring to FIG. 13, control information is mapped to x upper resource blocks and x lower resource blocks among the whole of allocated resource blocks. According to this mapping method, data information is allocated to the same frequency resource irrespective of slot change and control information is able to obtain more frequency diversity.

Third Embodiment

A third embodiment of the present invention related to a method of performing a layer mapping process and a DFT process on control information and data information, respectively and then multiplexing the control information and the data information on a time axis. In particular, the control information and the control information are transmitted on different symbols, respectively.

Figure 14:
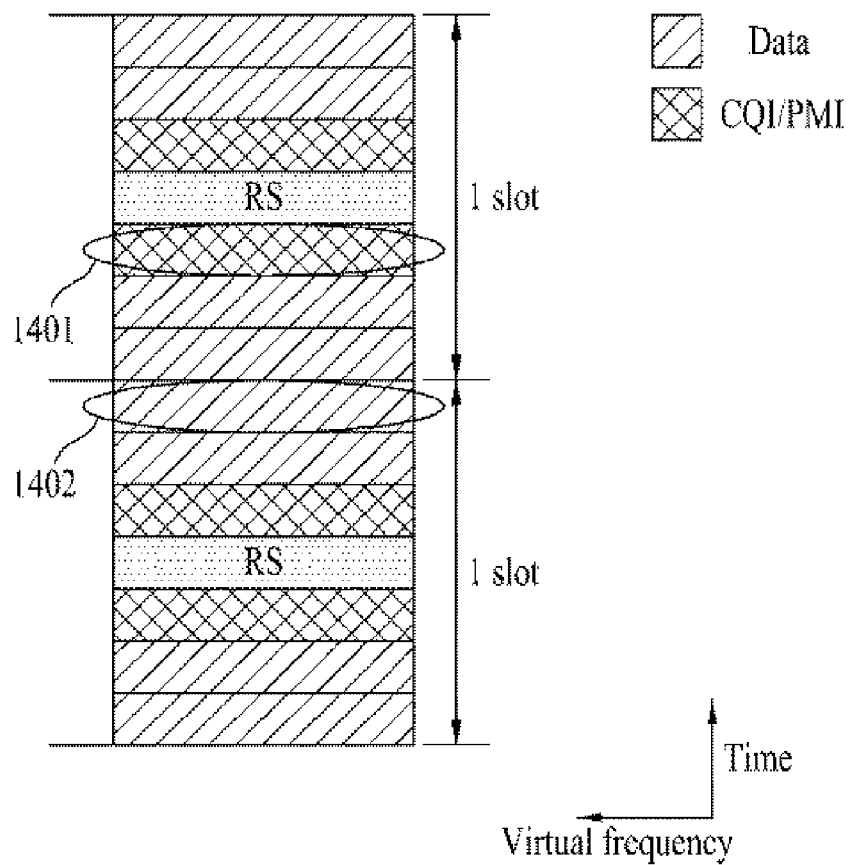
FIG. 14 is a diagram for a structure of an uplink frame in which control information and data information are multiplexed with each other according to a third embodiment of the present invention.

FIG. 14 is a diagram for a structure of an uplink frame in which control information and data information are multiplexed with each other according to a third embodiment of the present invention.

Referring to FIG. 14, DFT is separately performed on control information and data information. The control information and the data information are mapped to different SC-FDMA symbols, respectively. Although FIG. 14 shows an example that a size of the DFT for the control information is equal to that of the DFT for the data information, the present embodiment is applicable to a case that the sizes differ from each other.

Specifically, in case that such control information as CQI and PMI is transmitted by being adjacent to a reference signal, the third embodiment related to a structure that channel estimation performance of a base station can be enhanced. A process for multiplexing signals carried on specific symbols 1401 and 1402 shown in FIG. 14 is explained with reference to FIG. 15 as follows.

Figure 15:
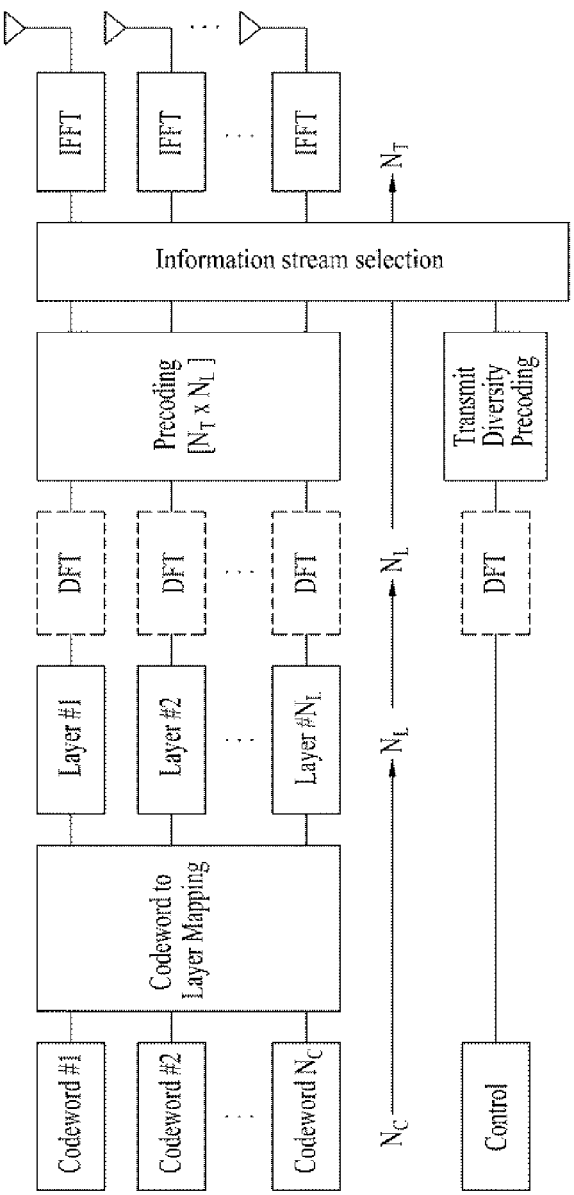
FIG. 15 is a diagram for explaining a method of transmitting an uplink signal according to a third embodiment of the present invention.

FIG. 15 is a diagram for explaining a method of transmitting an uplink signal according to a third embodiment of the present invention. FIG. 15 shows that DFT is performed on control information as well. And, it is apparent that the control information can skip the DFT process.

Referring to FIG. 15, since control information and data information are mapped to different SC-FDMA symbols, respectively, it is possible to apply different transmission schemes to the control information and the data information, respectively. In particular, a precoding matrix applied to the control information may be identical to a precoding matrix applied to the data information or may not. And, it is possible to use a precoding matrix optimized for each of the control information and the data information. Afterward, the control information and the data information are multiplexed on a time axis through an information stream selection process.

The number of SC-FDMA symbols for carrying control information is changeable according to an MCS level of the control information and a transmission scheme applied to a control information transmission. For instance, since STBC scheme requires at least two continuous symbols, if the STBC scheme is used for control information transmission, control information is transmitted via at least two continuous/spaced SC-FDMA symbols.

Figure 16:
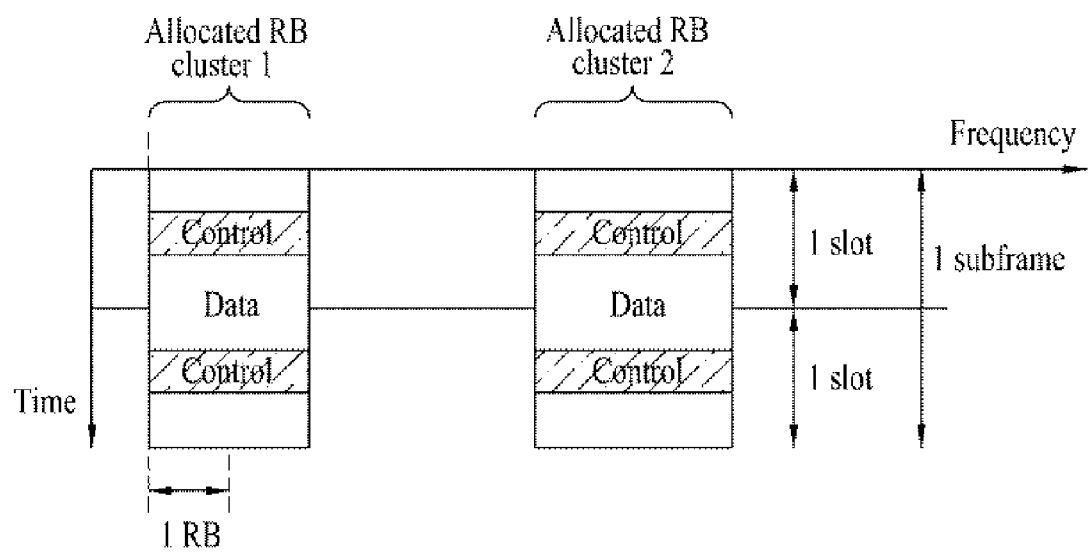
FIG. 16 is a diagram for explaining another method of transmitting an uplink signal according to a third embodiment of the present invention.

In order to secure inter-slot transmit diversity for SC-FDMA symbol transmit control information transmission having the same information by slot unit, the number of SC-FDMA symbols for the control information transmission can be doubled almost. Moreover, in order to maximally secure inter-slot frequency diversity, control information can be transmitted via the same number of SC-FDMA symbols in each slot. An example for allocating resources to control information and data information by this method is shown in FIG. 16. FIG. 16 is a diagram for explaining another method of transmitting an uplink signal according to a third embodiment of the present invention.

Fourth Embodiment

A fourth embodiment of the present invention relates to the combination of the second and third embodiments of the present invention. The second or third embodiment may cause a problem that a considerably large amount of resources are allocated for control information only (in aspect of frequency according to the second embodiment or in aspect of symbol according to the third embodiment). Therefore, the fourth embodiment of the present invention is a method for compensating this problem.

Figure 17:
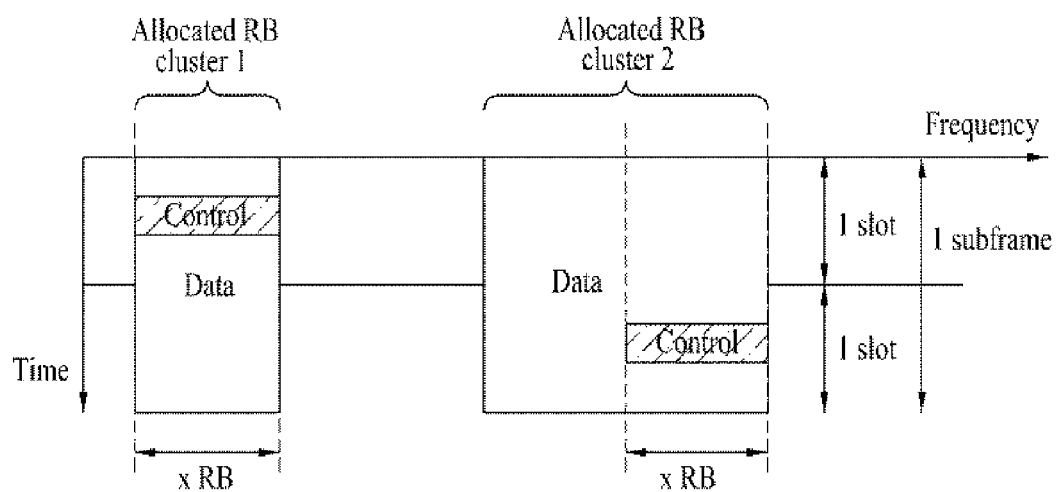
FIG. 17 is a diagram for an example of allocating resources to control information and data information according to a fourth embodiment of the present invention.

FIG. 17 is a diagram for an example of allocating resources to control information and data information according to a fourth embodiment of the present invention.

Referring to FIG. 17, a fourth embodiment of the present invention relates to a method of multiplexing control information and data information on a frequency axis and a time axis both. In particular, control information and data information undergo DFT and precoding processes separately, perform a subcarrier mapping process and an information stream selecting process, and are then multiplexed into a frequency domain and a time domain. In this case, the number of subcarriers allocated in the frequency domain and the number of SC-FDMA symbols in the time domain are determined according to an MCS level applied to the control information.

Fifth Embodiment

Figure 18:
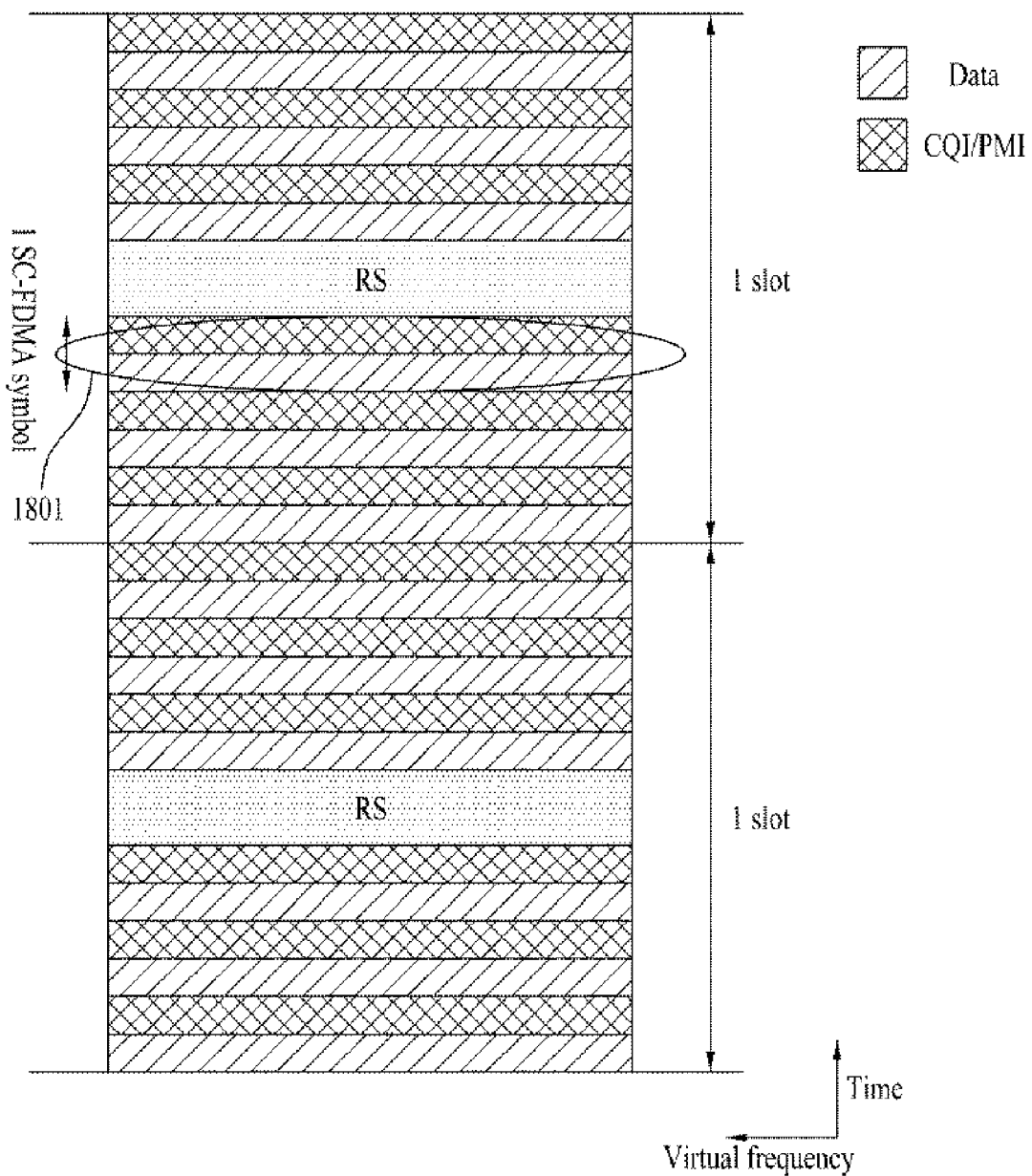
FIG. 18 is a diagram for a structure of an uplink frame in which control information and data information are multiplexed with each other according to a fifth embodiment of the present invention.

FIG. 18 is a diagram for a structure of an uplink frame in which control information and data information are multiplexed with each other according to a fifth embodiment of the present invention. The fifth embodiment of the present invention differs from the third embodiment of the present invention in that control information and data information are discriminated from each other on a time axis within one SC-FDMA symbol. In particular, according to the fifth embodiment of the present invention, control information and data information are mapped to SC-FDMA sub-symbols into which one SC-FDMA symbol is divided on time axis, respectively. In order to explain a process for multiplexing signals carried on a specific slot 1801, FIG. 19 is explained as follows.

Figure 19:
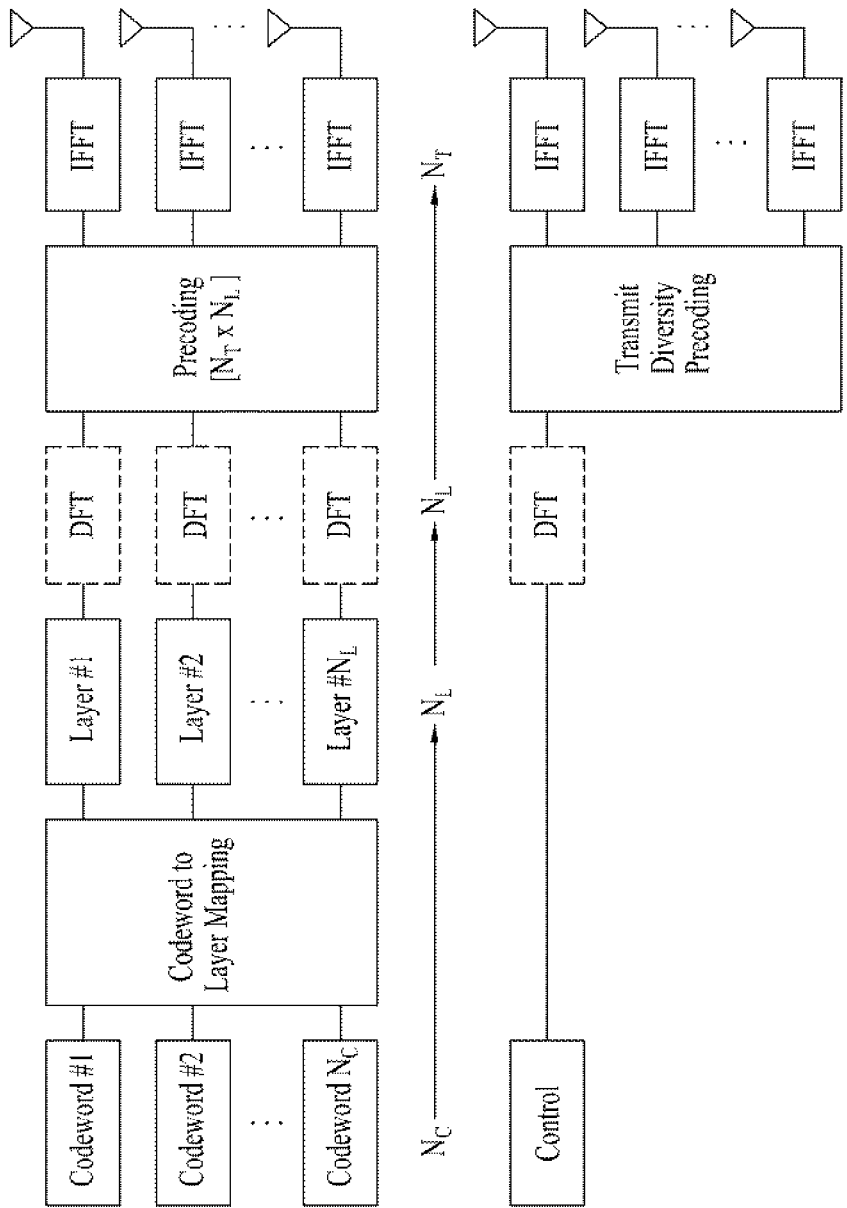
FIG. 19 is a diagram for explaining a method of transmitting an uplink signal according to a fifth embodiment of the present invention.

FIG. 19 is a diagram for explaining a method of transmitting an uplink signal according to a fifth embodiment of the present invention.

Referring to FIG. 19, in order to multiplex control information in a manner that the control information basically occupies a half of an allocated resource, i.e., a half of one SC-FDMA, it is necessary to adjust a subcarrier interval. In particular, a subcarrier interval should be increased by A-times to reduce a length of a transmission symbol for data on time axis. And, an IFFT size should be decreased by 1/A to maintain the same sampling rate. Therefore, in order that a half of one SC-FDMA is occupied, the subcarrier interval is increased by 2-times and the IFFT size should be decreased into ½.

Moreover, SC-FDMA sub-symbol for control information and SC-FDMA sub-symbol for data information can include CPs for protecting information from inter-symbol interference, respectively. Meanwhile, according to an MCS level for transmitting control information, IFFT sizes of control information and data information can be modified.

Sixth Embodiment

A modulation order and coding rate of control information rate-matched by one of the aforesaid embodiments can be calculated using a modulation order and coding rate of data information.

For instance, a coding rate for control information is calculated by multiplying a coding rate of data information by a predetermined first offset value (Beta$_{offset}$). In this case, the first offset value is provided to compensate a coding gain difference from the data information and a target block error rate to adjust reception reliability of the control information. Equation 1 is provided to calculate the number modulated control information symbols that should be met in a manner that the coded control information of the related art performs a rate matching process. Although Equation 1 describes CQI of control information, it is similarly applicable to such uplink control information as PMI, RI and the like.

$$Q_{cqi} = \text{ceiling}(\text{Beta}_{offset} \times 1/CR_{data} \times 1/Q_{mod} \times T_{cqi}) \text{ (where, ceiling}(x) \text{ indicates a round-up function of } x.) \quad \text{[Equation 1]}$$

In Equation 1, $Q_{cqi}$ indicates the number of modulation symbols or resource elements allocated for control information. Beta$_{offset}$ indicates the aforesaid first offset value and is a value signaled from a base station. $CR_{data}$ indicates a coding rate of data information. $Q_{mod}$ indicates the number of bit information included in one symbol, i.e., a modulation order. And, $T_{cqi}$ indicates the number of input bits for control information.

Meanwhile, the cording rate of the data information, i.e., the $CR_{data}$ is calculated by Equation 2.

$$CR_{data} = TBS_{data}(N_{RE} \times Q_{mod}) \quad \text{[Equation 2]}$$

In Equation 2, $TBS_{data}$ indicates the number of data payload bits including CRC information. And, $N_{RE}$ indicates the number of resource elements allocated to one subframe.

In case that control information is transmitted using an MIMO system, i.e., a spatial multiplexing form or a transmit diversity form, it can be observed that Equation 1 or Equation 2 is inaccurate in achieving a target block error rate of the control information. This is because the Equations fail to consider the following facts. First of all, inter-layer interference is generated when the control information is received by being mapped to a plurality of layers. Secondly, data information is constructed with a plurality off transport blocks (TBs) or codewords.

The present invention proposes a second offset value that considers inter-layer interference of control information. The second offset value is reflected on Equation 1 together with the first offset value and is named Alpha$_{offset}$ to be distinguished from the first offset value. The Alpha$_{offset}$ is a value signaled from a base station like the first offset value. Modification of Equation 1 in consideration of the second offset value is shown in Equation 3.

$$Q_{cqi} = \text{ceiling}(\text{Alpha}_{offset} \times \text{Beta}_{offset} \times 1/CR_{data} \times 1/Q_{mod} \times T_{cqi}) \quad \text{[Equation 3]}$$

In Equation 3, the second offset value is variable according to the number of layers to which control information is mapped.

In order to consider the fact that the data information is constructed with a plurality of transport blocks or codewords, the present invention proposes four schemes of modifying Equation 2 that defines a coding rate of data information.

According to a first scheme, like Equation 4, a coding rate of data information is defined as a value resulting from dividing a sum of all transport block sizes by a value resulting from multiplying the number of resource elements allocated to one layer in one subframe by a modulation order.

$$CR_{data} = (\text{Total } TBS)/(\text{Number of } RE \text{ in a single layer in subframe} \times Q_{mod}) \quad \text{[Equation 4]}$$

According to a second scheme, like Equation 5, a coding rate of data information is defined as a value resulting from dividing one transport block size by a value resulting from multiplying the number of resource elements allocated to one layer in one subframe by a modulation order.

$$CR_{data} = (\text{one certain } TBS)/(\text{Number of } RE \text{ in a single layer in subframe} \times Q_{mod}) \quad \text{[Equation 5]}$$

According to a third scheme, like Equation 6, a coding rate of data information is defined as a value resulting from dividing an average value of all transport blocks by a value resulting from multiplying the number of resource elements allocated to one layer in one subframe by a modulation order.

$$CR_{data} = (\text{average } TBS)/(\text{Number of } RE \text{ in a single layer in subframe} \times Q_{mod}) \quad \text{[Equation 6]}$$

According to a fourth scheme, assuming that data information is transmitted via all layers, a coding rate of a coding rate of layer is defined as a coding rate of data information. In particular, coding rates for all transport blocks are calculated by Equation 2 and an average of all the calculated coding rates is then defined as a coding rate of data information. An Equation for the fourth scheme is defined as follows.

$$CR_{data} = \text{average over } \{\text{'}X\text{'}((TBS \text{ of } TB \text{ '}X\text{'})/(\text{Number of layers mapped to } TB \text{ '}X\text{'} \times \text{Number of } RE \text{ in subframe} \times Q_{mod}))\} \quad \text{[Equation 7]}$$

Figure 20:
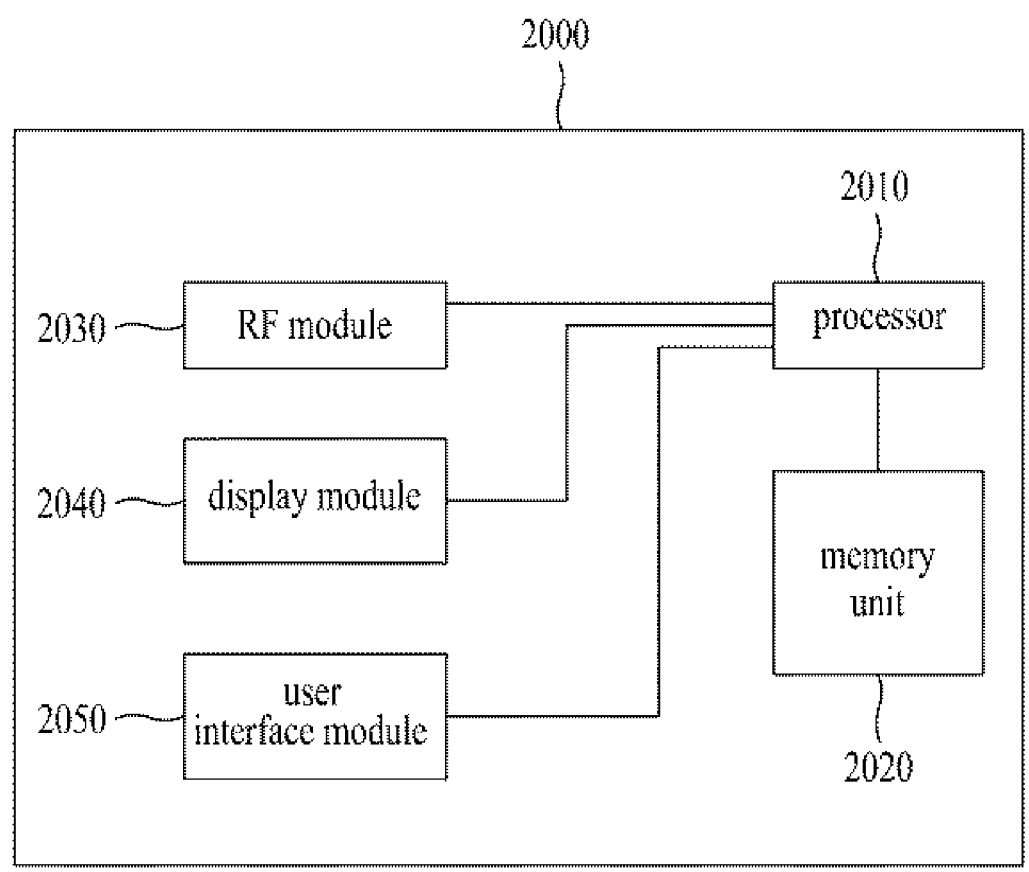
FIG. 20 is a block diagram of a user equipment apparatus according to one embodiment of the present invention.

FIG. 20 is a block diagram of a user equipment apparatus according to one embodiment of the present invention.

Referring to FIG. 20, a user equipment apparatus 2000 includes a processor 2010, a memory 2020, an RF module 2030, a display module 2040 and a user interface module 2050.

The user equipment apparatus 2000 is shown in the drawing for clarity of description. Some of the modules can be omitted. The user equipment apparatus 2000 can further include necessary module(s). And, a prescribed one of the modules included in the user equipment apparatus 2000 can be divided into sub-modules.

First of all, the processor 2020 is able to perform operations required for multiplexing a control signal and a data signal with each other. Details of the operations of the processor 2020 can refer to the contents described with reference to FIGS. 1 to 19.

The memory 2020 is connected to the processor 2010. And, an operating system, applications and general files are stored in the memory 2020.

The RF module 2030 is connected to the processor 2010 and plays a function of converting a baseband signal to a radio signal, and vice versa. For this, the RF module 203 performs analog conversion, amplification, filtering and frequency uplink transform or reverse processes thereof.

The display module 2040 is connected to the processor 2010 and displays various information. And, the display module 2040 can be implemented using such a well-known component as an LCD (liquid crystal display), an LED (light emitting diode), an OLED (organic light emitting diode) and the like.

And, the user interface module 2050 is connected to the processor 2010 and can be configured by being combined with such a well-known user interface as a keypad, a touch-screen and the like.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are described centering on the data transmission/reception relations between a base station and a terminal. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As mentioned in the foregoing description, a method of transmitting an uplink signal in an MIMO wireless communication system and apparatus therefore are described with reference to an example applied to 3GPP LTE system. Moreover, the present invention is applicable to various mobile communication systems of transmitting uplink signals by applying the similar DFT processes as well as to the 3GPP LTE system.

The invention claimed is:

1. A method of transmitting uplink signal in a wireless communication system, the method comprising:
  mapping the uplink signal comprising control information and transport blocks corresponding to data information to a plurality of spatial resources; and
  transmitting the uplink signal to a base station by using the plurality of spatial resources,
  wherein the transport blocks corresponding to data information are mapped to all of the plurality of spatial resources,
  wherein the control information is mapped to specific spatial resources from the plurality of spatial resources,
  wherein the control information is multiplexed with a specific transport block among the transport blocks corresponding to the data information, and
  wherein the number of modulated symbols (Q) per spatial resource for the control information is determined by a following Equation 1:

$$Q = \text{ceiling}(\text{Beta}_{offset} \times 1/CR_{data} \times 1/Q_{mod} \times T) \quad \text{<Equation 1>}$$

(where the ceiling(x) is a round-up function of the x, wherein the Beta$_{offset}$ is an offset value, the CR$_{data}$ is a coding rate of the specific transport block among the transport blocks, the Q$_{mod}$ is a modulation order, and the T is a number of input bits for the control information).

2. The method of claim 1, wherein the specific spatial resources correspond to the specific transport block.

3. The method of claim 1, wherein the specific transport block and the control information are sequentially combined.

4. The method of claim 1, wherein a pilot sequence or a zero sequence is mapped to the rest of the spatial resources.

5. The method of claim 1, wherein the spatial resources are layers.

6. The method of claim 1, wherein the CR$_{data}$ is determined by a following Equation 2:

$$CR_{data} = TBS/(N_{RE} \times Q_{mod}) \quad \text{<Equation 2>}$$

(where the TBS is the size of the specific transport block, and the N$_{RE}$ is the number of allocated resource elements per spatial resource).

7. The method of claim 6, wherein the resource element is defined by one modulated symbol and one subcarrier.

8. The method of claim 1, wherein the offset value Beta$_{offset}$ is used for compensating reception reliability of the control information in comparison with the data information and received from the base station.

9. The method of claim 1, wherein the control information is channel quality information (CQI).

10. A method of transmitting uplink signal in a wireless communication system, the method comprising:

mapping the uplink signal comprising control information and transport blocks corresponding to data information to a plurality of layers; and transmitting the uplink signal to a base station by using the plurality of layers, wherein the control information is multiplexed with all of the transport blocks corresponding to the data information, wherein the number of modulated symbols (Q) per layer for the control information is determined by a following Equation 3:

$$Q = \text{ceiling}(\text{Beta}_{\text{offset}} \times 1/CR_{data} \times 1/Q_{mod} \times T) \quad \text{<Equation 3>}$$

(where the ceiling(x) is a round-up function of the x, wherein the $\text{Beta}_{\text{offset}}$ is an offset value for compensating reception reliability of the control information in comparison with the data information, the $CR_{data}$ is an average of coding rates for the transport blocks corresponding to the data information, the $Q_{mod}$ is a modulation order, and the T is an input bit number for the control information).

11. A user equipment comprising:

a processor for mapping uplink signal comprising control information and transport blocks corresponding to data information to a plurality of spatial resources; and a transmitting module for transmitting the uplink signal to a base station by using the plurality of spatial resources, wherein the transport blocks corresponding to data information are mapped to all of the plurality of spatial resources, wherein the control information is mapped to specific spatial resources correspond to the specific transport block from the spatial resources, wherein the control information is multiplexed with a specific transport block among the transport blocks corresponding to the data information, and wherein the number of modulated symbols (Q) per spatial resource for the control information is determined by a following Equation 1:

$$Q = \text{ceiling}(\text{Beta}_{\text{offset}} \times 1/CR_{data} \times 1/Q_{mod} \times T) \quad \text{<Equation 1>}$$

(where the ceiling(x) is a round-up function of the x, wherein the $\text{Beta}_{\text{offset}}$ is an offset value, the $CR_{data}$ is a coding rate of the specific transport block among the transport blocks, the $Q_{mod}$ is a modulation order, and the T is a number of input bits for the control information).

12. The user equipment of claim 11, wherein the specific transport block and the control information are sequentially combined.

13. The user equipment of claim 11, wherein the $CR_{data}$ is determined by a following Equation 2:

$$CR_{data} = TBS/(N_{RE} \times Q_{mod}) \quad \text{<Equation 2>}$$

(where the TBS is the size of the specific transport block, and the $N_{RE}$ is the number of allocated resource elements per spatial resource).

* * * * *